3,050,668
FEEDBACK AND COMMAND SIGNAL COMBINING SERVOSYSTEM TO PRODUCE QUADRATURE OUTPUT CONTROL VOLTAGES
William M. Pease, Wellesley, and Theodore P. Heuchling, Concord, Mass. (both % Feedback Controls, Inc., 899 Main St., Waltham, Mass.)
Filed Feb. 24, 1959, Ser. No. 795,136
19 Claims. (Cl. 318—30)

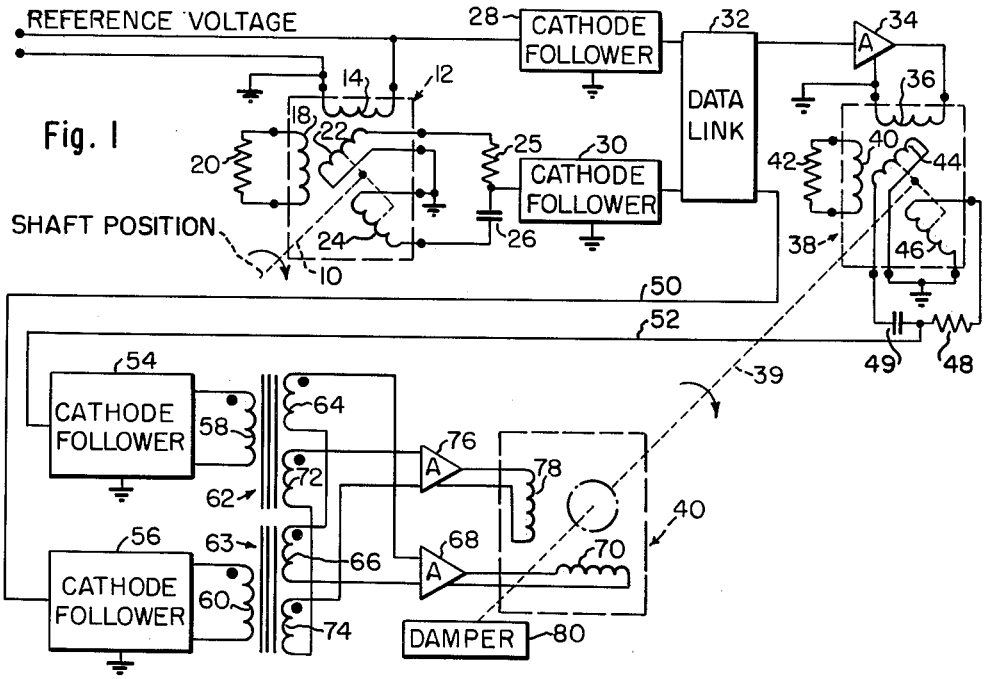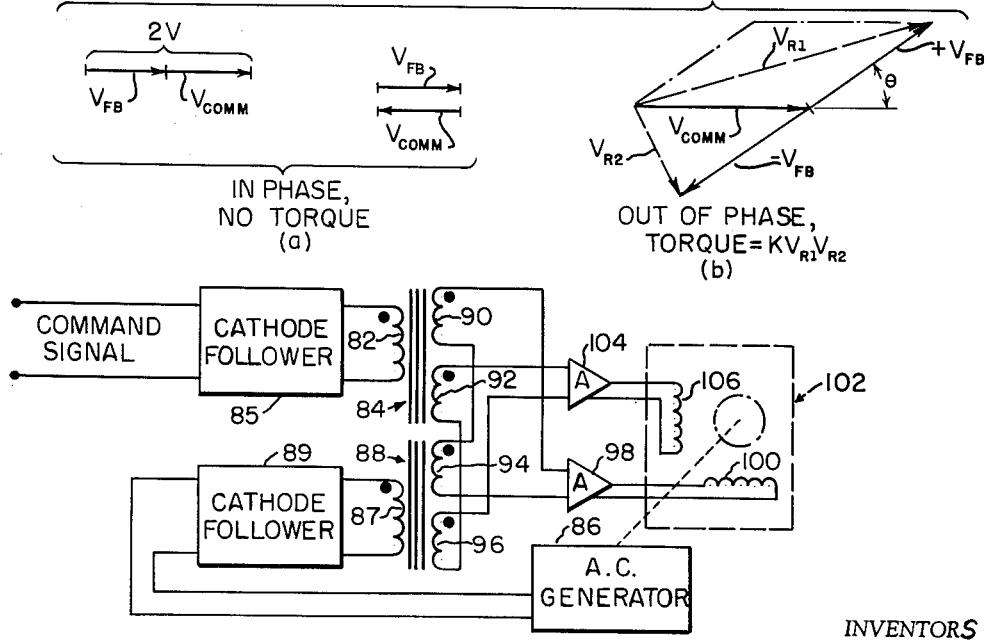

Our invention relates to an improved servomechanism. More particularly it relates to a servomechanism utilized to reproduce a shaft position at a remote location which has high performance but is economical in construction, and also to servomechanisms utilized for speed control of a rotating shaft.

In many applications it is desirable to position a shaft in accordance with the position of another shaft which is remote from it, either in time or space or both. For example, in search radar systems the yoke associated with a PPI display must be rotated in synchronism with the radar antenna, although the display may be physically located at some distance from the antenna. In certain types of automatic machine tool control systems, the motion of the cutting tools, and the work positioning table are recorded on magnetic tape as the part is made by a skilled machinist. This tape may then be used in conjunction with other equipment to control automatically another similar machine tool to reproduce the exact part. However, the reproduction may take place at a different location and at a later time than the original manufacture.

It has also long been recognized that it is desirable to minimize that number and kind of information channels in the data link connecting the command shaft (e.g. the radar antenna, or the work table and cutter positioning shafts of the manually operated machine tool), and the positioned shaft (e.g. the PPI yoke or the work table and cutter positioning shafts). In the past one way in which the number of required data link channels has been minimized is to indicate shaft position by the relative phase of two alternating current signals of substantially the same frequency.

In this system a position indicating device, which produces a phase varying alternating current signal as its shaft is rotated, is mechanically connected to the command shaft. Synchros or resolvers are commonly used for this purpose. The position indicating device is energized with a reference signal, and usually produces a pair of amplitude modulated output signals the amplitude modulation depending on a trigonometric function of the shaft angle with respect to a reference position. These output signals may be combined, by a network of appropriate design, into a single signal of constant amplitude whose time phase varies with respect to the reference signal as the command shaft is rotated, but whose frequency is the same as the reference signal. When this system is used, and a number of shaft positions are to be transmitted, as from several radars or the multiple axes of the work table and cutter positioning mechanisms, only one narrow band information channel is required for each channel, with one additional channel for the common references for all the position indicators. Multiple channels are also required when multiple speed systems are used to indicate the position of a single shaft.

While systems of the type described are extremely desirable from the standpoint of minimization of the number and fidelity requirements of the information channels in the data link between the command and driven shafts, the servomechanisms heretofore employed to utilize the transmitted signals for shaft positioning tended to be complex and expensive. In general, in prior servos utilizing signals of the type described as input signals, the transmitted reference signal was fed to a shaft position indicator attached to the shaft to be positioned; the position indicator usually was of the same type used to indicate command shaft position, and provided a single alternating signal whose phase with respect to the reference represented the actual position of the driven shaft. This signal will hereinafter be termed the "feedback signal." The feedback signal and that from the command shaft position indicator, herein termed the "command signal" were compared in phase, by means of conventional phase-detecting circuits, to develop a direct voltage whose magnitude and polarity were proportional to the phase difference between the feedback and command signals. This direct voltage was then utilized as the error signal in a conventional servo system. Two major problems were present in such servo shaft position repeaters however.

The direct voltage error signal was usually accompanied by substantial ripple components which made it difficult to obtain good dynamic accuracy in the servo repeater. Another problem was that of expense and reliability. In many applications large numbers of repeater servomechanisms of the type described are utilized. The electronics equipment associated with the phase detectors substantially increased the cost and lowered the reliability of the servos.

It has previously been proposed by others to use a two phase induction servomotor as the phase detector in servomechanisms of this type. Motors of this type produce a torque which is proportional in magnitude and direction to the sine of the phase angle between the alternating voltage applied to the windings of each phase as well as to the magnitude of the applied voltages, i.e. $T = V_1 V_2 \sin \theta$, where T is the motor torque, $V_1$ is the amplitude of the voltage applied to one phase, $V_2$ is the amplitude of the voltage applied to the other phase and $\theta$ is the relative phase angle. It will be observed that the torque produced is directly proportional to $\sin \theta$ and will be 0 when $\theta = 0$.

It has been proposed to use the command and feedback signals as $V_1$ and $V_2$ since they are of substantially constant amplitude. Thus when the signals are at 90° with respect to each other, maximum torque will be produced; as the two signals come into phase the torque of the motor tends to decrease until at zero degrees, when the feedback signal and the data signal are in phase, no torque will be produced.

However, this system suffered from a major defect. At small values of error i.e. when the feedback and command signals were out of phase by only a few degrees, the quadrature component of the two signals was very small since it is proportional to the phase angle of the two voltages. Increasing the magnitude of the two voltages by amplification did not alleviate this situation since at some value of applied voltage the magnetic flux path in the servomotor saturated and further application of the signal applied thereto produced no increase in motor magnetic flux. In general, motor field saturation took place at values of voltage which did not provide sufficient stiffness at small angular errors for a high performance servo repeater. Accordingly two-phase motors have not been extensively used in this manner and the more complex conventional positioning system using electronic phase-sensitive detectors has generally been used.

Phase-comparison systems similar to those described above in connection with positioning systems have also been used for shaft speed control systems. In this application an alternating current generator or like device attached to the shaft whose speed is to be controlled generates a feedback signal. This feedback signal is compared in phase with a command signal and the phase difference is utilized as an error signal to control the speed of the drive motor whose speed is increased or decreased to maintain the feedback and command signals in phase with each other. Such systems are accordingly termed "phase-locked" systems. By varying the command signal frequency, the speed of the controlled shaft may be varied. In general, apparatus similar to that used with position servomechanisms is used to drive the servomotor, and the apparatus presents the same problems as those of the position servomechanism. Phase-locked servomechanisms of this type usually incorporate an auxiliary velocity-sensitive control to correct gross speed errors.

Accordingly, it is a general object of our invention to provide an improved servomechanism which is economical of manufacture and simple in construction.

Another object of our invention is to provide an improved servo-operated shaft position repeater of the type described.

Still another object of our invention is to provide a speed control servomechanism of the type described.

Another object of our invention is to provide a servomechanism of the type described having high dynamic performance which utilizes a two phase induction servomotor as the detector for two alternating current signals whose phase difference represents the servo error.

Another object of our invention is to provide a servomechanism of the type described in which variations in the error signal represented by variations in the phase difference between the feedback and command signal are converted to amplitude variations in two signals having a constant relative phase of 90°.

Still another object of our invention is to provide a servomechanism of the type described utilizing only alternating current signal channels, thus eliminating the drift and ripple problems associated with direct current detectors and amplifiers.

A further object of our invention is to provide a servomechanism of the type described which includes means for damping the servomechanism to achieve high performance.

A still further object of our invention is to provide a method of converting a pair of alternating signals having varying phase to a pair of alternating signals having constant relative phase, but varying amplitude.

Other and further objects of our invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of our invention, reference should be had to the following detailed description taken in connection with accompanying drawing in which:

FIG. 1 is a block and line diagram of a complete servo shaft repeater system, made according to our invention;

FIG. 2 is a series of vector diagrams showing the voltage relationships in the servomechanism made according to our invention; and FIG. 3 is a block and line diagram of a speed control servomechanism made according to our invention, the auxiliary velocity-sensitive control normally associated with such a system being omitted for purposes of clarity.

In general, we have found that substantially improved performance with simplicity of construction can be achieved in servos of the type described by utilizing the alternating command and feedback signals to develop a second pair of alternating signals which have a constant relative phase and whose amplitude varies in accordance with the phase variation of the command and feedback signals. A pair of signals useful for exciting a two phase induction servomotor may be simply developed by generating the vector sum and the vector difference of the feedback and command signals, these signals being of equal amplitude when the vector sum and difference are generated. It can be shown that the vector sum and difference signals will always have a constant relative phase of 90° and that for small values of relative phase angle, the vector sum signal remains substantially constant in amplitude, while the vector difference signal varies almost directly with variations in phase angle. When these signals are used as the excitation signals for a two phase servomotor, its torque will vary directly with the amplitude of the vector difference signal, since the sum signal remains substantially constant and is at 90° with respect to the difference signal. The servo system gain can be suitably adjusted by adjustment of the amplification of the vector difference signal. Since no direct current signal corresponding to the error signal is present in the servomechanisms made according to our invention, compensation of the servo utilizing conventional direct current networks is not possible without demodulation of the A.C. signal and remodulation, with their attendant complexities. We have found, however, that output dampers of the viscous or magnetic type mounted in the servomotor shaft provide satisfactory compensation for servos of this type. We have also found that tachometers, suitably excited, may also be used for damping.

More particularly, in FIGURE 1 we have illustrated a complete servo system incorporating a servo shaft position repeater made according to our invention. As shown therein, the command shaft 10, whose position is to be repeated has attached thereto a resolver, generally indicated at 12. One of the two resolver stator coils 14 is excited by the reference voltage. The other stator coil 18 is terminated in a resistor 20, so that the output impedance of the two rotor coils 22 and 24, will be constant regardless of rotor position. The coils 22 and 24 are in space quadrature and produce voltages whose amplitude is dependent upon their rotational position with respect to the excited winding 14. The two signals, induced in the windings 22 and 24 are of the same time phase as the reference voltage, however.

The two signals induced in windings 22 and 24 are converted to a signal of substantially constant amplitude whose time phase with respect to the phase of the reference voltage is a measure of shaft position by the network composed of resistor 25 and capacitor 26. A synchro or other device might be substituted for the resolver 12 if desired, in which case the network would be of a different configuration. The network output signal and the reference signal are fed to the cathode followers 28 and 30 respectively for impedance matching purposes and then are impressed on the data link, indicated by the block 32.

As previously explained the data link may be a cable or a radio link including a transmitting and receiving station, or it may be a storage device such as a magnetic tape on which the command shaft signals are recorded for later playback. Other types of data storage, including digital data storage might be used for this purpose.

After passage through the data link, the command signal appears on lead 50 and the reference signal is fed to amplifier 34. The output signal from amplifier 34 is applied as a reference signal to the stator winding 36 of the resolver generally indicated at 38. The rotor of resolver 38 is mechanically coupled to the shaft 39 of the two phase induction servomotor 40, whose position is to be controlled in accordance with the position of command shaft 10. Resolver 38 is connected in the same manner as resolver 12. Thus stator winding 41 is connected to a fixed resistor 42 corresponding to the resistor 20 associated with resolver 12. The rotor windings 44 and 46 are connected together at one end and grounded, as illustrated, and their other ends are connected to the network composed of resistor 48 and capacitor 49 which is substantially identical to the network formed by resistor 25 and capacitor 26. The feedback signal appearing on lead 52 will then be an alternating signal whose time phase with respect to the reference voltage is a measure of the position of shaft 39. By comparing the phase of the voltage on lead 52, which is a measure of actual controlled shaft position with the phase of the voltage on lead 50 which is a measure of desired controlled shaft position, an error signal may be developed to drive the motor 40.

As has been explained, the prior practice was to apply these two signals to conventional phase detectors to develop a direct voltage error signal, which is then applied to a conventional servomotor. However, we have found that substantially improved results with much less equipment complexity can be obtained if the two signals are used to generate two further signals proportional to their vector sum and vector difference, when the command and feedback signals are identical in magnitude.

When the command and feedback signals are in phase, the vector sum and vector difference of the two equal amplitude signals will be as shown in FIG. 2(a). If the amplitude of each signal is V, then the sum vector will be the amplitude 2V. However, the difference vector will be zero, and hence the motor will have no torque, since the motor torque is proportional to the produce of the two voltages applied to its windings.

When there is phase angle $\theta$ between the command and feedback voltages, the vector diagram of FIG. 2(b) shows the relationship between the sum and difference vectors. The amplitude of the sum vector $V_{r1}$, is given by the following equation:

$$V_{r1} = \sqrt{(V_{comm} + V_{fb} \cos \theta)^2 + (V_{fb} \sin \theta)^2} \quad (1)$$

As previously explained, $V_{comm}$ and $V_{fb}$, are adjusted to have equal amplitude V prior to obtaining the sum and difference signals. Thus, $$V_{r1} = V\sqrt{(1 + \cos \theta)^2 + (\sin \theta)^2}$$
$$= V\sqrt{1 + 2\cos \theta + \cos^2 \theta + \sin^2 \theta} \quad (2)$$

Since $\sin^2 \theta + \cos^2 \theta = 1$, Equation 2 simplifies to:

$$V_{r1} = V\sqrt{2 + 2\cos \theta}$$
$$= \sqrt{2}V\sqrt{1 + \cos \theta} \quad (3)$$

The difference signal amplitude, $V_{r2}$ may be similarly derived:

$$V_{r2} = \sqrt{(V_{comm} - V_{fb} \cos \theta)^2 + (V_{fb} \sin \theta)^2} \quad (4)$$
$$= V\sqrt{(1 - \cos \theta)^2 + (\sin \theta)^2}$$
$$= V\sqrt{(1 - 2\cos \theta) + \cos^2 \theta + \sin^2 \theta} \quad (5)$$
$$= \sqrt{2}V\sqrt{1 - \cos \theta} \quad (6)$$

It will be observed that the amplitude of $V_{r1}$ is proportional to the square root of $1 + \cos \theta$, while the amplitude of $V_{r2}$ is proportional to the square root of $1 - \cos \theta$. For $\theta = 0°$, the radical will have a value of the $\sqrt{2}$ for $V_{r1}$ and 0 for $V_{r2}$, which agrees with the results shown in FIGS. 2(a) and 2(b). For small angular changes of $\theta$ from 0°, the percentage variation in $V_{r1}$ will be small while $V_{r2}$ will change almost linearly with the angular change. Thus, for $\theta = 10°$, which would be a large value of servo error, $\sqrt{1 + \cos \theta} = 1.409$. For $\theta = 0°$, $\sqrt{1 + \cos \theta} = 1.414$. The difference in amplitude of $V_{r1}$ between $\theta = 0°$ and $\theta = 10°$ is only about 0.35%. Similarly for $\theta = 20°$, $V_{r1}$ changes from its value at 0° by only about 1.5%. However, for $\theta = 10°$, $\sqrt{1 - \cos \theta}$ is 0.122 and for $\theta = 20°$, $\sqrt{1 - \cos \theta}$ is approximately 0.245. Thus as $\theta$ varies from 10° to 20° the change in $V_{r1}$ was a little more than 1% while $V_{r2}$ varied almost directly with the change in angle. Accordingly $V_{r1}$ can be amplified to a value which supplies substantially rated voltage to one winding of motor 40 and applied as a reference phase; $V_{r2}$, which varies almost directly in amplitude with the phase angle for small angular differences between feedback and command signals can be applied to the servo motor as its control signal. By varying the amplification of $V_{r2}$, the gain of the servomechanism can be adjusted for optimum response.

As has been mentioned, the relative phase of $V_{r1}$ and $V_{r2}$ is always 90° if $V_{comm}$ and $V_{fb}$ are of equal amplitude, regardless of the phase angle $\theta$, between them. From observation of FIGURE 2(b) it will be observed that $V_{r1}$ and $V_{r2}$ have the same orientation as the two diagonals of a parallelogram having equal sides. When the phase angle $\theta$ is 90°, the parallelogram becomes a square, and the two diagonals are equal in amplitude. From geometrical considerations it can readily be shown that the two diagonals of an equal sided parallelogram are at right angles to each other.

Referring again to FIGURE 1, the command and feedback signals on leads 50 and 52 respectively are fed as input signals to the cathode followers 54 and 56. The command signal and the feedback signal are adjusted to substantially the same amplitude and the cathode followers 54 and 56 serve an impedance matching and isolating function. However, if necessary, limiters, attenuators or amplifiers may be inserted in the circuit at this point to insure that the command and feedback signals applied respectively to the primary windings 58 and 60 of the transformers generally indicated at 62 and 63 are, within broad tolerance limits, the same amplitude. It is to be noted that the system of our invention will operate satisfactorily if the signals are not exactly equal. The effect of inequality is similar to the effect of quadrature signal in a conventional alternating-current servomechanism. Some inequality can be tolerated depending upon performance requirements, but large inequalities may result in a degradation of system performance.

One secondary winding 64 of transformer 62 and the secondary winding 66 of transformer 63 are connected in series aiding, as shown by the polarity dots, and the vector sum of the command and feedback signals is produced by them, a signal proportional to the command signal being induced in winding 66, and a signal proportional to the feedback signal being induced in winding 64. The vector sum of these two signals is applied as an input signal to amplifier 68, and the output of this amplifier is used to energize winding 70, one of the two windings of motor 40.

As has been mentioned, the gain of amplifier 68 is preferably adjusted so that the magnitude of the voltage applied to winding 70 is sufficient to supply rated voltage to the winding in motor 40. This insures that even the very minor variations in amplitude of the sum vector do not have any appreciable effect on servo performance.

The difference vector $V_{r2}$ is formed by the secondary windings 72 of transformer 62 and 74 of transformer 63, the windings being connected in series opposing as shown by the polarity dots on the windings. A voltage proportional to the feedback signal is induced in winding 72, while a corresponding voltage proportional to the command voltage is induced in winding 74. The difference voltage is amplified by amplifier 76 and applied to the winding 78 of motor 40. The servomechanism may be adjusted for optimum performance by adjustment of the gain of amplifier 76 in accordance with known servo principles.

It is to be understood of course that other equipment might be used to obtain the vector sum and vector difference of the feedback and command voltages. Conventional resistive or capacitive summing networks with appropriate inverters might be used for example, or other known types of A.C. analog computing circuits.

Because the servomechanism illustrated in FIG. 1 is entirely an alternating current device, conventional direct current compensating networks for improving servo performance cannot be used without introducing demodulation and remodulation, with attendant complexity. However, we have found that magnetic or viscous-coupled inertia dampers, such as damper 80, secured to the motor shaft provide satisfactory damping for the device. In particular, viscous-coupled inertia dampers both with and without additional resilient coupling between the motor shaft and the inertia, have been found to be extremely satisfactory for the application.

A servo which has been built according to our invention, which utilized a 60 cycle carrier frequency, and a single speed data system as illustrated in FIG. 1, exhibits a static accuracy of better than ± degree. The servo velocity constant, which is the ratio of steady-state output velocity to the error necessary to produce that velocity, was in excess of 100 per second. The servo had a 2 cycle per second bandwidth. With a 1 and 36 speed data system, which would require only one additional channel in the data link, the static accuracy could be improved directly by a factor of 36. It is to be understood of course that the figures given are by way of example only, and that the results achieved were the result of considerations of design not necessarily dependent upon our invention. Other and superior results may be achieved where they are desired.

In FIG. 3 we have illustrated a servomechanism made according to our invention for the control of shaft speed rather than shaft position, it being understood that this servo will usually be used in conjunction with an auxiliary velocity-sensitive control, which is not here illustrated. As shown therein, the command signal is fed to the primary winding 82 of the transformer 84 via cathode follower 85, while the feedback signal, from an alternating current generator 86 or other device capable of generating an electric signal whose frequency is dependent upon shaft speed, is fed to the primary winding 87 of the transformer 88 via cathode follower 89. The secondary windings 90 and 92 of transformer 84 and 94 and 96 of transformer 88 are connected in the same manner as illustrated in FIG. 1 to form the vector sum and vector difference signals from the command and data signals i.e. windings 90 and 94 are connected in series aiding to form the vector sum signal and windings 92 and 96 are connected in series opposing to form the difference signal. The sum signal is amplified by amplifier 98 and applied to winding 100 of the two phase servo motor 102. The difference signal is amplified by amplifier 104 and applied to winding 106 of servomotor 102.

The servomechanism illustrated in FIG. 3 operates in the manner previously described with a constant phase difference between the command and feedback voltage sufficient to maintain the speed of motor 102 such that the generator output signal is the same frequency as the command signal in the steady state condition. If the gain of amplifier 104 is sufficiently great, this constant phase difference between the two signals is so small that it may be neglected and the feedback and command signals are effectively in phase.

It is to be understood, of course, that the servomotor 102 of FIG. 3 may be used to operate the speed control for a larger device whose speed is to be controlled e.g. the throttle valve of a steam turbine, in which case the alternating current generator 86 would be mounted on the shaft of the speed-controlled element. When the servomotor speed is not being controlled but it is being used to position a control element as in the application described, the phase angle between the command and feedback voltage may be 0° in the steady state condition.

Thus, we have provided improved servomechanisms which convert the phase difference of two alternating current signals of substantially equal frequency to a corresponding angular position or rotational speed. A command signal and a feedback signal whose difference represents the servo position or speed error are combined to generate a second pair of signals having a constant relative phase of 90°, one of this second pair of signals having substantially constant amplitude, and the other having an amplitude which varies substantially directly with the phase angle of the original signals for small phase angles. We have found that a conventional two phase induction servomotor may be used as a phase detector for the second pair of signals. The resulting servo has high dynamic performance and positions a shaft with substantial accuracy if used as a position device, or controls shaft speed in a phase-locked system. The servo is entirely an alternating current device. Compensation for a position servomechanism made according to our invention is effected with magnetic or viscous-coupled inertia dampers secured to the servomotor shaft. We have also found that the driving signals for the servomotor may be readily obtained by taking the vector sum and the vector difference of the command and feedback voltages when the two voltages are substantially equal. Servos built according to our invention, because of the elimination of direct current phase detectors, and other direct current circuits eliminate the drift and ripple problems associated with former servos of this type, while yet achieving the same or better standards of performance.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A servomechanism comprising, in combination, a two-phase servomotor, a feedback element adapted to provide an alternating electrical signal, means connecting said feedback element and the shaft of said servomotor, input terminals associated with said servomechanism for connecting an alternating current command signal thereto, means for forming a signal proportional in amplitude to the vector sum of a pair of alternating current signals connected thereto, means forming a signal proportional in amplitude to the vector difference of a pair of alternating current signals connected thereto, means connecting said feedback and command signals to said summing and differencing means, and means connecting the output of said summing means to one phase of said servomotor, and means connecting the output of said differencing means to the other phase of said servomotor.

2. A servomechanism adapted to position a shaft in accordance with the relative phase of an alternating current command signal connected thereto comprising, in combination, a two-phase servomotor, a feedback element including a shaft adapted to generate an alternating current signal whose relative phase depends upon said shaft position, means interconnecting the shaft of said servomotor and said feedback element, means for generating a signal proportional to the vector sum of two alternating current signals connected thereto, means for generating a signal proportional to the vector difference of two alternating current signals connected thereto, means connecting the signal generated by said feedback element to said summing means and said differencing means, means connecting said command signal to said summing means and said differencing means, means connecting the output signal of said summing means to one phase of said servomotor and means connecting the output of said differencing means to the other phase of said servomotor.

3. The combination defined in claim 2 in which said summing and differencing means include a pair of transformers, each of said transformers having a primary winding and at least two secondary windings, one of said primary windings being energized by said command signal and the other of said primary windings being energized by the signal from said feedback element, one of the secondary windings on each of said transformers being connected in series aiding to produce a signal directly related to the vector sum of the signals applied to the primary windings thereof, and another of said secondary windings on each of said transformers being connected in series opposing to produce a signal directly related to the vector difference of the signals applied to the primary windings thereof.

4. The combination defined in claim 3 in which the voltages induced in each of said secondary windings of said transformers are substantially equal in magnitude.

5. The combination defined in claim 2 in which the means connecting said summing means and one of said motor windings includes an amplifier having sufficient gain to amplify said vector sum signal to a value sufficient to supply rated voltage to said motor associated with said winding.

6. The combination defined in claim 2 in which the means connecting said differencing means and said motor winding includes an amplifier.

7. The combination defined in claim 2 in which said servomechanism includes damping means, and means connecting said damping means to the shaft of said servomotor.

8. A servomechanism for repeating a shaft position, the electrical input signals to said servomechanism comprising a pair of alternating signals of substantially equal frequency, the phase difference between said signals indicating the desired shaft position, comprising, in combination, a two-phase servomotor, a feedback element having a shaft and adapted to generate at least two alternating current signals of varying amplitude when said shaft is rotated and said element is energized, means interconnecting said motor shaft and said feedback element shaft; means connecting a first of said input signals to energize said feedback element means combining the amplitude varying signals generated by said feedback element into a single feedback signal, the phase of said feedback signal varying with respect to said energizing signal as said shaft is rotated, means forming a signal related to the vector sum and the vector difference of the second of said input signals and said feedback signal means connecting said signal related to the vector sum to one phase of said servomotor, and means connecting the signal related to the vector difference to the other phase of said servomotor.

9. The combination defined in claim 8 in which said feedback element is a resolver.

10. The combination defined in claim 8 in which said feedback element is a synchro generator.

11. The combination defined in claim 8 which includes means for making said feedback and command signals substantially equal in magnitude, before forming said vector sum and vector difference signals.

12. A servomechanism adapted to control the speed of a rotating shaft in accordance with the frequency of an alternating command signal connected thereto, comprising, in combination, a servomotor for controlling said shaft speed, a feedback element adapted to generate a feedback signal whose frequency is dependent upon the speed of said controlled shaft, means for generating a signal proportional to the vector sum of two alternating current signals connected thereto, means for generating a signal proportional to the vector difference of two alternating current signals connected thereto, means connecting the signal generated by said feedback element to said summing means and said differencing means, means connecting said command signal to said summing means and said differencing means, means connecting the output signal of said summing means to one phase of said servomotor and means connecting the output of said differencing means to the other phase of said servomotor.

13. The combination defined in claim 12 in which said summing and differencing means include a pair of transformers, each of said transformers having a primary winding and at least two secondary windings, one of said primary windings being energized by said command signal and the other of said primary windings being energized by the signal from said feedback element, one of the secondary windings on each of said transformers being connected in series aiding to produce a signal directly related to the vector sum of the signals applied to the primary windings thereof, and another of the secondary windings on each of said transformers being connected in series opposing to produce a signal directly related to the vector difference of the signals applied to the primary windings thereof.

14. The combination defined in claim 13 in which the voltages induced in each of said secondary windings of said transformers are substantially equal in magnitude.

15. The combination defined in claim 12 in which the means connecting said summing means and one of said motor windings includes an amplifier having sufficient gain to amplify said vector sum signal to a value sufficient to supply rated voltage to said motor associated with said winding.

16. The combination defined in claim 12 in which said servomechanism includes damping means, and means connecting said damping means to the shaft of said servomotor.

17. A servomechanism for controlling shaft speed in accordance with an alternating command signal, the frequency of said command signal indicating desired shaft speed, comprising, in combination, a two-phase servomotor for controlling the speed of said controlled shaft, an alternating current generator adapted to generate a feedback signal, means interconnecting the shaft of said generator and the shaft whose speed is to be controlled, the feedback signal from said generator being an alternating signal whose frequency is dependent on the speed of said controlled shaft, means forming a pair of signals from said command signal and said feedback signal, one of said pair of signals being related to the vector sum of said command and feedback signals, and the other of said pair of signals being related to the vector difference of said command and feedback signals, means connecting said vector sum signal to one phase of said servomotor, and means connecting said vector difference signal to the other phase of said servomotor.

18. The combination defined in claim 17 which includes means for making said feedback and command signals substantially equal in magnitude, before forming said vector sum and vector difference signals.

19. The method of generating a pair of alternating voltages having a constant 90° relative phase angle from a pair of alternating voltages having a variable relative phase angle comprising in combination the steps of making said voltages having a variable phase angle substantially equal in amplitude, forming the vector sum of said voltages, and forming the vector difference of said voltages, said vector sum and said vector difference voltages having a substantially constant 90° relative phase.

References Cited in the file of this patent

UNITED STATES PATENTS

| | | |
|---|---|---|
| 2,703,380 | Fraser | Mar. 1, 1955 |
| 2,759,109 | Swift | Aug. 14, 1956 |
| 2,760,132 | Pawley | Aug. 21, 1956 |
| 2,762,005 | Harvey et al. | Sept. 4, 1956 |
| 2,825,261 | Weinstein | Mar. 4, 1958 |

OTHER REFERENCES

Grey, Alexander: Principles and Practice of Electrical Engineering, First Edition, page 235, Fig. 266, McGraw-Hill, New York, 1917.